United States Patent
Thomson et al.

(10) Patent No.: US 12,227,441 B2
(45) Date of Patent: Feb. 18, 2025

(54) MINERAL RECOVERY ENHANCED DESALINATION (MRED) PROCESS FOR DESALINATION AND RECOVERY OF COMMODITY MINERALS

(71) Applicant: UNM Rainforest Innovations, Albuquerque, NM (US)

(72) Inventors: Bruce Thomson, Albuquerque, NM (US); Kerry Howe, Albuquerque, NM (US); Ayush R Shahi, Englewood, CO (US); Sugam Tandukar, Albuquerque, NM (US)

(73) Assignee: UNM Rainforest Innovations, Albuquerque, NM (US)

( * ) Notice: Subject to any disclaimer, the term of this patent is extended or adjusted under 35 U.S.C. 154(b) by 115 days.

(21) Appl. No.: 17/301,617

(22) Filed: Apr. 9, 2021

(65) Prior Publication Data
US 2021/0317026 A1  Oct. 14, 2021

Related U.S. Application Data

(60) Provisional application No. 63/007,620, filed on Apr. 9, 2020.

(51) Int. Cl.
| | | |
|---|---|---|
| *C02F 9/00* | (2023.01) | |
| *C01D 3/06* | (2006.01) | |
| *C01F 5/14* | (2006.01) | |
| *C02F 1/20* | (2023.01) | |
| *C02F 1/42* | (2023.01) | |
| *C02F 1/44* | (2023.01) | |
| *C02F 1/52* | (2023.01) | |
| *C02F 101/10* | (2006.01) | |
| *C02F 101/12* | (2006.01) | |
| *C02F 103/08* | (2006.01) | |

(Continued)

(52) U.S. Cl.
CPC .................. *C02F 9/00* (2013.01); *C01D 3/06* (2013.01); *C01F 5/14* (2013.01); *C04B 11/264* (2013.01); *C02F 1/20* (2013.01); *C02F 1/42* (2013.01); *C02F 2001/425* (2013.01); *C02F 1/442* (2013.01); *C02F 1/52* (2013.01); *C02F 2101/101* (2013.01); *C02F 2101/12* (2013.01); *C02F 2103/08* (2013.01); *C02F 2103/18* (2013.01); *C02F 2303/16* (2013.01)

(58) Field of Classification Search
CPC ...... C02F 9/00; C02F 1/20; C02F 1/42; C02F 1/442; C02F 2001/425; C02F 2103/08; C01D 3/06; C01F 11/005
See application file for complete search history.

(56) References Cited

U.S. PATENT DOCUMENTS

| | | | | |
|---|---|---|---|---|
| 2014/0227151 A1* | 8/2014 | Davis | ...................... | B01D 61/44 204/627 |
| 2016/0367936 A1* | 12/2016 | Ukai | ...................... | B01D 53/80 |
| 2019/0263697 A1* | 8/2019 | Ganzi | ...................... | C02F 9/00 |

OTHER PUBLICATIONS https://www.collinsdictionary.com/dictionary/english/commodity Retrieved Mar. 1, 2024 (Year: 2024).*

(Continued)

*Primary Examiner* — Magali P Slawski
*Assistant Examiner* — Bernadette Karen McGann
(74) *Attorney, Agent, or Firm* — Mueting Raasch Group

(57) ABSTRACT

A novel process for treatment of low quality or brackish water that allows increased recovery of high quality water, recovers commodity minerals and reduces the volume of water and mass of solids that are disposed from the process.

15 Claims, 4 Drawing Sheets

(51) Int. Cl.
  *C02F 103/18* (2006.01)
  *C04B 11/26* (2006.01)

(56) References Cited

OTHER PUBLICATIONS https://www.ahdictionary.com/word/search.html?q=commodity Retrieved Mar. 1, 2024 (Year: 2024).*
https://www.oed.com/search/dictionary/?scope=Entries&q=commodity Retrieved Mar. 1, 2024 (Year: 2024).*

* cited by examiner

MINERAL RECOVERY ENHANCED DESALINATION (MRED) PROCESS FOR DESALINATION AND RECOVERY OF COMMODITY MINERALS

CROSS-REFERENCE TO RELATED APPLICATIONS

The following application claims benefit of U.S. Provisional Application No. 63/007,620 filed Apr. 9, 2020, which is hereby incorporated by reference in its entirety.

STATEMENT REGARDING GOVERNMENT SPONSORED RESEARCH

This invention was made with Government support under Grant No. DE-FE0030584 awarded by the U.S. Department of Energy. The U.S. Government has certain rights in this invention.

BACKGROUND

While significant resources have been developed to desalinate seawater, particularly as a water source for coastal communities, fewer options exist for inland communities where water reclamation often involves desalination of lower quality water from municipal and industrial wastewater and brackish water (total dissolved solids (TDS) concentration less than 10,000 mg/L) and/or highly saline water (TDS concentration greater than 10,000 mg/l.) The ability to desalinate lower quality water at inland locations is often limited by accumulation of deposits resulting from mineral precipitation on heat exchange surfaces for thermal desalination processes, or accumulation of deposits or mineral precipitates on the surfaces of membranes associated with reverse osmosis (RO), electrodialysis reversal (EDR) and other membrane processes. Accumulation of mineral precipitates is commonly referred to as scale formation. Accordingly, successful implementation of any desalination process requires pretreatment of the feed water to limit scale formation.

Formation of mineral scale deposits is especially challenging for waters containing high concentrations of multivalent cations and anions such as the cations calcium ($Ca^{2+}$), magnesium ($Mg^{2+}$), aluminum ($Al^{3+}$), and iron ($Fe^{2+}$ and $Fe^{3+}$), the anions sulfate ($SO_4^{2-}$) and bicarbonate/carbonate ($HCO_3^-/CO_3^{2-}$), and dissolved silica ($SiO_2$) as are frequently found in lower quality or reclaimed water sources. Desalination of seawater typically requires the relatively straightforward removal of monovalent ions such as potassium ($K^+$), sodium ($Na^+$) and chloride ($Cl^-$), which have little or no potential to form scale in desalination processes because of the high solubility of their respective precipitates. However, while multivalent scale forming constituents are present at low concentrations in seawater, they are often present at high concentrations in brackish and saline ground water and in many municipal and industrial wastewaters. The necessity of limiting scale formation from high concentrations of these constituents limits the ability to recover a large fraction of the feed water and also increases the cost and complexity of managing and disposing of waste products from desalination processes.

The ability to recover a larger fraction of the water fed to a desalination process is especially important in arid regions where water resources are scarce. Thus, a process that will enable enhanced recovery of a larger fraction of the feed water will offer an important advantage by increasing the volume of treated water that can be recovered for the community or industry.

A further challenge faced by desalination projects at inland locations is disposal of waste disposal. Waste from a desalination plant consists of liquid and solid flows containing all of the constituents removed from the feed water by any pre-treatment process as well as dissolved constituents removed from the water by desalination process itself. These include liquid streams, slurries, or dry solids with high concentrations of salts, organic compounds, inorganic and organic suspended solids, and microorganisms. If the feed water contains toxic or hazardous metals or organic compounds, these will also be present in the waste from the desalination process and their concentration will be increased by a factor that is approximately proportional to the inverse of the fraction of feed water that is recovered. The high salinity brine from the desalination process itself is commonly referred to as concentrate. Whereas high salinity concentrate from desalination plants at coastal locations can often be returned to the ocean, at inland locations disposal options of these waste streams are limited and the waste management and disposal process are complicated and costly. A pretreatment process that can reduce the volume and mass of waste products from an inland desalination plant will therefore offer important benefits to improving plant performance, increasing the fraction of feed water that can be recovered for beneficial use, and decreasing the cost of waste management and disposal.

The concentrate characteristics from current desalination systems is primarily determined by the need to prevent scale formation that will limit performance of the desalination process whether it be based on thermal or membrane technologies. Operating the plant at a higher feed water recovery will increase the concentration of scale forming constituents in the concentrate that will in turn cause scale formation which decreases performance of the plant. However, there is a significant need for water desalination systems that produce high quality water. Moreover, rather than being viewed as simply a waste product, inland water resources that may serve as a source of supply for a desalination plant often contain high concentrations of commodifiable materials which, if processes are developed to recover them, can be sold, recycled, or utilized in other ways. Of course it will be appreciated that such a system requires significant expertise in development as the complex chemical reactions which are involved can be unpredictably effected by the wide variability in the condition and composition of different brackish and/or wastewater sources (or even the same brackish/wastewater source over time) thus making the development of wastewater treatment systems that produce high quality water from waters containing high concentrations of multivalent cations and anions and which also incorporate the recovery of commodifiable minerals therefrom a highly complex task which, until now, has not been fully developed.

SUMMARY

The present disclosure provides methods and apparatus for a novel process that comprises pretreatment of brackish or saline water prior to desalination that achieves three goals: (1) allows increased recovery of low quality or brackish water by reducing the scale forming potential of this water that is fed to a subsequent desalination process, (2) recovers commodity minerals from low quality or brackish water, and (3) reduces the volume water and mass of solids that are disposed from the subsequent desalination process. Specifically, the present disclosure provides an innovative process to desalinate brackish or saline water by treating the feed water using a unique sequence of unit operations that selectively remove scale forming constituents, produce marketable commodities from these constituents, increase the fractional recovery of the feed water to the plant, and reduce the cost and complexity of managing and disposing of waste products. The treatment process is referred to herein as the Mineral Recovery Enhanced Desalination (MRED) Process.

DETAILED DESCRIPTION

Figure 1:
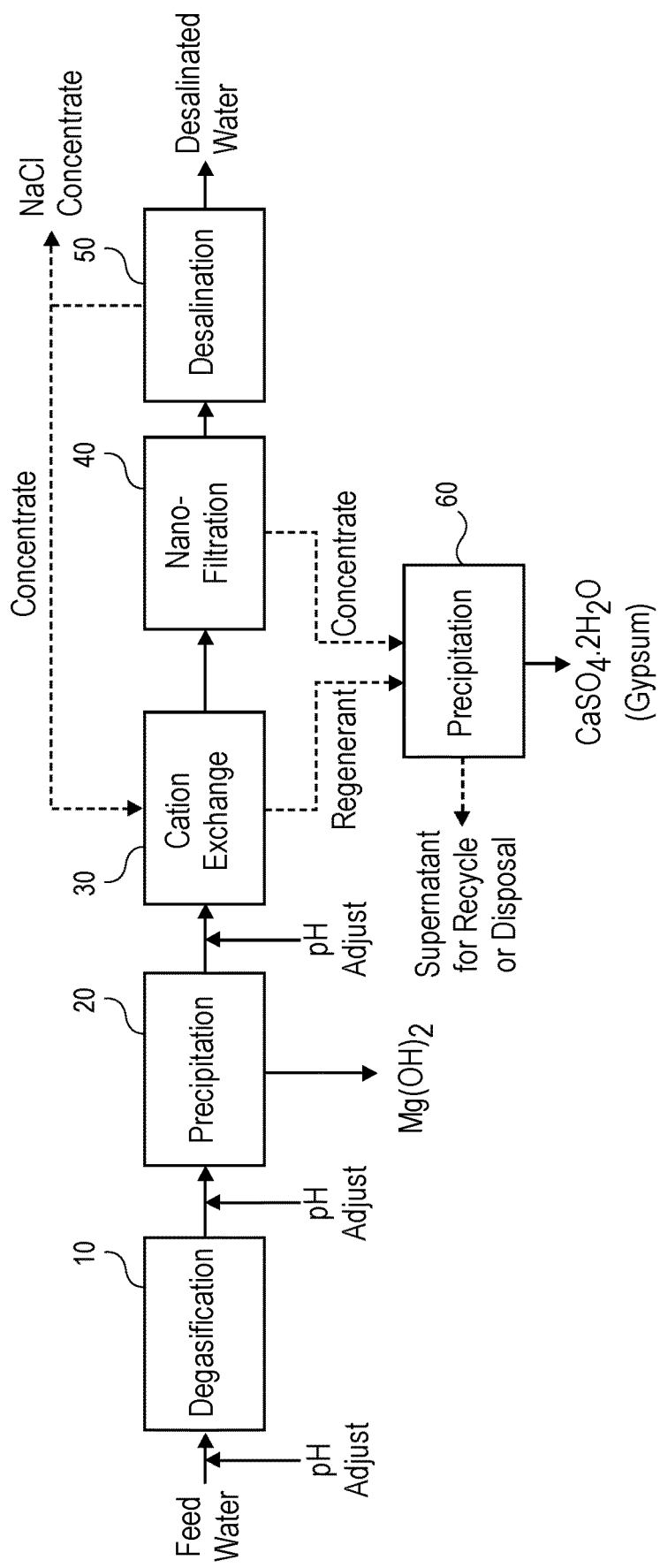
FIG. 1 is a flowchart demonstrating a first embodiment of the Mineral Recover Enhanced Desalination (MRED) process disclosed herein.

According to an embodiment the present disclosure provides methods and apparatus for a novel process to pre-treat low quality wastewater, brackish water or saline water to achieve recovery of commodity minerals and increase water recovery from a subsequent desalination process.

According to an embodiment, the MRED process is used for desalination of brackish or saline water containing high concentrations of multivalent cations, anions and dissolved silica. (Of course it will be understood that the process could also be used for desalination of other types of water including any type of water or water from any source that contains "contaminants" which it is desirable to remove.) Non-limiting examples of water suitable for this process include brackish or saline ground water, acid mine drainage, and industrial wastewaters such as flue gas desulfurization (FGD) wastewater. FGD wastewater is produced by limestone scrubbers which remove $SO_2$ from the combustion gases from coal fired power plants. Brackish or saline water amenable to treatment by the MRED process includes, but is not necessarily limited to, water with total dissolved solids (TDS) concentrations ranging from 1,000 mg/L to 20,000 mg/L. The principal constituents in the feed water typically, though not necessarily exclusively include, sodium (Na), calcium (Ca), magnesium (Mg), chloride (Cl), sulfate ($SO_4$) and bicarbonate/carbonate ($HCO_3^-/CO_3^{2-}$), and/or high concentrations of dissolved silica ($SiO_2$).

According to an embodiment, the MRED process recovers salts such as magnesium hydroxide ($Mg(OH)_2$), magnesium chloride ($MgCl_2$), calcium chloride ($CaCl_2$), and gypsum ($CaSO_4 \cdot 2H_2O$), which are marketable commodities. The only waste from the process is a concentrated salt brine (predominantly NaCl and/or KCl) that, depending on its quality, may also have commercial value as industrial salt.

According to an embodiment, the MRED produces high quality water which, for the purposes of this disclosure is defined as water that is suitable for potable water supply or other uses requiring a low TDS water with no toxic or hazardous constituents present. In some instances "high quality water" may have a TDS of below 500 mg/L, below 100 mg/L, below 50 mg/L or below 5 mg/L. For the purpose of the present disclosure, "low quality water" is defined as water with a TDS above 500 mg/L.

FIG. 1 provides a general process flow diagram showing a first embodiment of an MRED process according to the present disclosure. In general, as shown, the process includes the following steps: degasification 10, precipitation 20, cation exchange 30, nanofiltration 40, and desalination 50 all of which take place in sequence, while a second precipitation step 60 occurs in parallel with some of the other stages. Each stage of the process is discussed in greater detail below. Please note that in FIGS. 1, 2 and 4, solid lines are used to show continuous flow whereas dashed lines may refer to intermittent flow or continuous flow, depending on the size of the treatment plant and how the technology is implemented.

Degasification 10 removes dissolved carbon dioxide ($CO_2$) from the water. In this embodiment, it is accomplished by adding an acid to lower the pH to less than 6 which removes alkalinity and converts bicarbonate ($HCO_3^-$) and carbonate ($CO_3^{2-}$) ions to $CO_2$ which is then removed from solution by air stripping. Examples of suitable acids include, but are not limited to, hydrochloric acid (HCl) and sulfuric acid ($H_2SO_4$). $CO_2$ removal prevents precipitation of carbonate minerals such as calcite ($CaCO_3$) in subsequent unit operations. Removing alkalinity reduces the amount of base or acid to change the pH of the water in subsequent unit operations. Air stripping of $CO_2$ will also raise the pH which reduces the amount of base needed for pH adjustment in subsequent operations.

During the precipitation unit operation 20, a strong base such as but not limited to sodium hydroxide (NaOH), potassium hydroxide (KOH), or hydrated lime ($Ca(OH)_2$) is added to raise the pH to 11 or greater which causes precipitation of hydroxide constituents such as magnesium hydroxide ($Mg(OH)_2$). $Mg(OH)_2$ solids are removed by sedimentation or filtration. High pH precipitation will also remove dissolved silica ($SiO_2$), iron (Fe), aluminum (Al) and other trace metals. Sedimentation or filtration will also remove any suspended solids present in the feed water. Precipitated magnesium hydroxide ($Mg(OH)_2$) has value as a commodity mineral.

It is noted that the particular acids and bases used to decrease or increase pH, respectively, can affect the concentrations of various constituents in the process. For example, substitution of $H_2SO_4$ for HCl would increase the concentration of sulfate ions while the addition of $Ca(OH)_2$ instead of NaOH would increase the calcium concentration. This type of substitution may enhance the performance of the MRED process by equalizing the stoichiometric ratio of specific cations such as calcium ($Ca^{2+}$) or anions such as sulfate ($SO_4^{2-}$) needed to maximize the performance of the subsequent gypsum precipitation process.

Cation exchange is a type of ion exchange (IX) process in which positively charged cations are exchanged between ions in solution and those on a resin or mineral surface. The ion exchange operation 30 (also referred to herein as a cation exchange operation) is a form of the ion exchange process that selectively recovers multivalent cations from solutions by exchanging them for monovalent ions in ion exchange (IX) column. Because $Mg'$ and other multivalent cations such as $Fe^{2+}$, $Fe^{3+}$, and $Al^{3+}$ have already been removed the only multivalent cation at high concentration in the feed water is divalent calcium ($Ca^{2+}$). Calcium is selectively removed from solution by the ion exchange resin and sodium ($Na^+$) is released into solution. The ion exchange resin will also remove divalent barium ($Ba^{2+}$) and strontium ($Sr^{2+}$), if present, which could otherwise form scale and foul downstream membrane processes even at very low concentrations. After all exchange sites on the resin are filled with calcium ions, the resin is regenerated by passing a high concentration salt (NaCl) brine, known as the regenerant solution, back through the resin bed. The regenerant leaving the ion exchange column consists of a brine in which the major ions are primarily sodium, calcium, and chloride. The waste regenerant is fed to the second precipitation unit operation 60 to precipitate gypsum ($CaSO_4 \cdot 2H_2O$).

The nanofiltration (NF) unit operation 40 receives effluent from the IX column in unit operation 30. The effluent is a solution in which the major ions are primarily sodium, chloride and sulfate ions. In the NF process, a softening membrane selectively removes polyvalent ions from solution. A softening membrane is a type of reverse osmosis membrane that restricts multivalent ions from passing through but allows monovalent ions to pass. In this case the principal multivalent ion is comprised of sulfate ions because all calcium, magnesium and other multivalent cations have been removed by previous unit operations. Removal of the multivalent cations allows much higher recovery of water by the NF process because recovery is not limited by precipitation of scale minerals that would foul the NF membrane surface. The concentrate solution from the NF process contains high concentrations of sodium, chloride, and sulfate and is fed to the second precipitation unit operation 60. The water passing through the NF membrane is referred to as the NF permeate and has high concentrations of sodium, potassium, chloride and other monovalent ions, and very low concentrations of calcium, magnesium, sulfate and bicarbonate or other multivalent ions, which greatly reduces potential scale formation in the subsequent desalination process. It is noted that while this process is referred to herein as nanofiltration, the principal ion exclusion is achieved by diffusion in which water molecules and singly charged molecules move through the membrane by diffusion while multivalent ions and molecules larger than water are excluded, rather than filtration such as occurs in membrane filtration.

The degasification unit operation 10, precipitation unit operation 20, ion exchange unit operation 30, and nanofiltration unit operation 40 have selectively removed magnesium, calcium, bicarbonate/carbonate, and sulfate thus producing a soft water solution containing only sodium, potassium, and chloride. This solution has little or no scaling potential and therefore is amenable to very high water recovery by desalination processes. Desalination processes that could be used for this feed water include, but are not limited to, membrane processes such as reverse osmosis, (RO) and electrodialysis reversal (EDR), or thermal distillation processes such as conventional distillation, multistage flash distillation, membrane distillation (MD), or vacuum distillation. Because the feed water is soft and will not form mineral scale, higher recovery of the feed water is possible. Water recovered from the desalination process will be of very high quality with very low concentrations of dissolved constituents including total dissolved solids (TDS), and can be discharged, used for potable water supply, used for industrial process water or other applications requiring high quality low TDS water. The concentrated brine from the desalination process, called concentrate is a solution with high concentrations of sodium, and chloride. If the feed water has high concentrations of potassium ($K^+$) it will also be present in the concentrate from the desalination process. Some of the concentrate is recycled to regenerate the cation exchange resin thus eliminating the need to purchase salt. RO concentrate may have value as an industrial quality salt solution or can be disposed of.

The regenerant solution from the cation exchange unit operation 30 and the concentrate from the NF process unit operation 40 contain high concentrations of calcium and sulfate respectively. When combined, they generate a solution that is supersaturated in gypsum ($CaSO_4 \cdot 2H_2O$), which will precipitate. The precipitated gypsum is removed by, for example, settling or filtration and can be sold as a commodity. A supernatant remains after the solids are removed. This supernatant may be returned back to the treatment process (i.e. recycled) to enable additional recovery of calcium or other constituents or it may simply be disposed of with other process wastes.

It should be noted that the performance of a process for pre-treating hard brackish water prior to desalination is complicated due to the high ionic strength and near saturation conditions for common scale forming minerals found in such water. The only current pre-treatment technology for desalination is to soften the water by chemical precipitation or ion exchange to non-selectively remove calcium and magnesium. It does not allow for recovery of commodity minerals nor does it decrease the volume or mass of desalination concentrate requiring disposal. Ionic strength is important because as it increases above about 0.01 M the chemical behavior of individual molecules becomes affected. This is especially true for ions because at high ionic strength their reactivity is decreased by electrostatic interactions with neighboring ions.

Moreover, there are significant solubility considerations created by the presence of cabonates such as calcite ($CaCO_3$) calcium fluoride ($CaF_2$), sulfates such as gypsum ($CaSO_4$-$2H_2O$) and barite ($BaSO_4$) and silica ($SiO_2$). Specifically, because the current process desires to obtain specific commodifiable materials, one has to ensure that the desired commodifiable material is precipitated at the desired time. If the goal is to obtain $Mg(OH)_2$, for example, it is important that other materials such as Anhydrite, Gypsum, calcite and dolomite don't coprecipitate with the $Mg(OH)_2$.

Coal fired electric power plants in the U.S. are required to treat coal combustion gases to remove pollutants including particulates, and gases, especially sulfur dioxide ($SO_2$) and nitrogen oxides ($NO_x$). $SO_2$ is most commonly removed through the use of FGD scrubbers in which combustion gases are passed up through a tower and a water spray is passed down to transfer gas phase $SO_2$ into water. In approximately 85% of the coal fired power plants in the US, the scrubber solution consists of a limestone ($CaCO_{3(s)}$) slurry so that the dissolved $SO_2$ is oxidized, which forms a saturated solution of gypsum represented as $CaSO_4 \cdot 2H_2O$. $NO_x$ is usually removed by selective catalytic reduction in which gaseous ammonia ($NH_3$) is added so that the $NO_x$ is reduced to $N_{2(g)}$. This process often produces elevated nitrate ($NO_3$) concentrations in the FGD wastewater. Moreover, coal combustion gases have other contaminants that are also captured in the scrubber water. the FGD scrubber solution is recycled multiple times, increasing the concentrations of these constituents. A fraction of the scrubber solution is drawn off as blowdown to keep concentrations of constituents from increasing to problematic levels. The principal constituent of concern is chloride ($Cl^-$), which at high concentrations is very corrosive to ferrous metals, even stainless steel. This blowdown constitutes FGD wastewater. The high water demand for FGD scrubbers and treatment of this wastewater has been recognized as an industry challenge in an analysis performed by DOE (DOE, 2014; Carney and Shuster, 2014).

Figure 2:
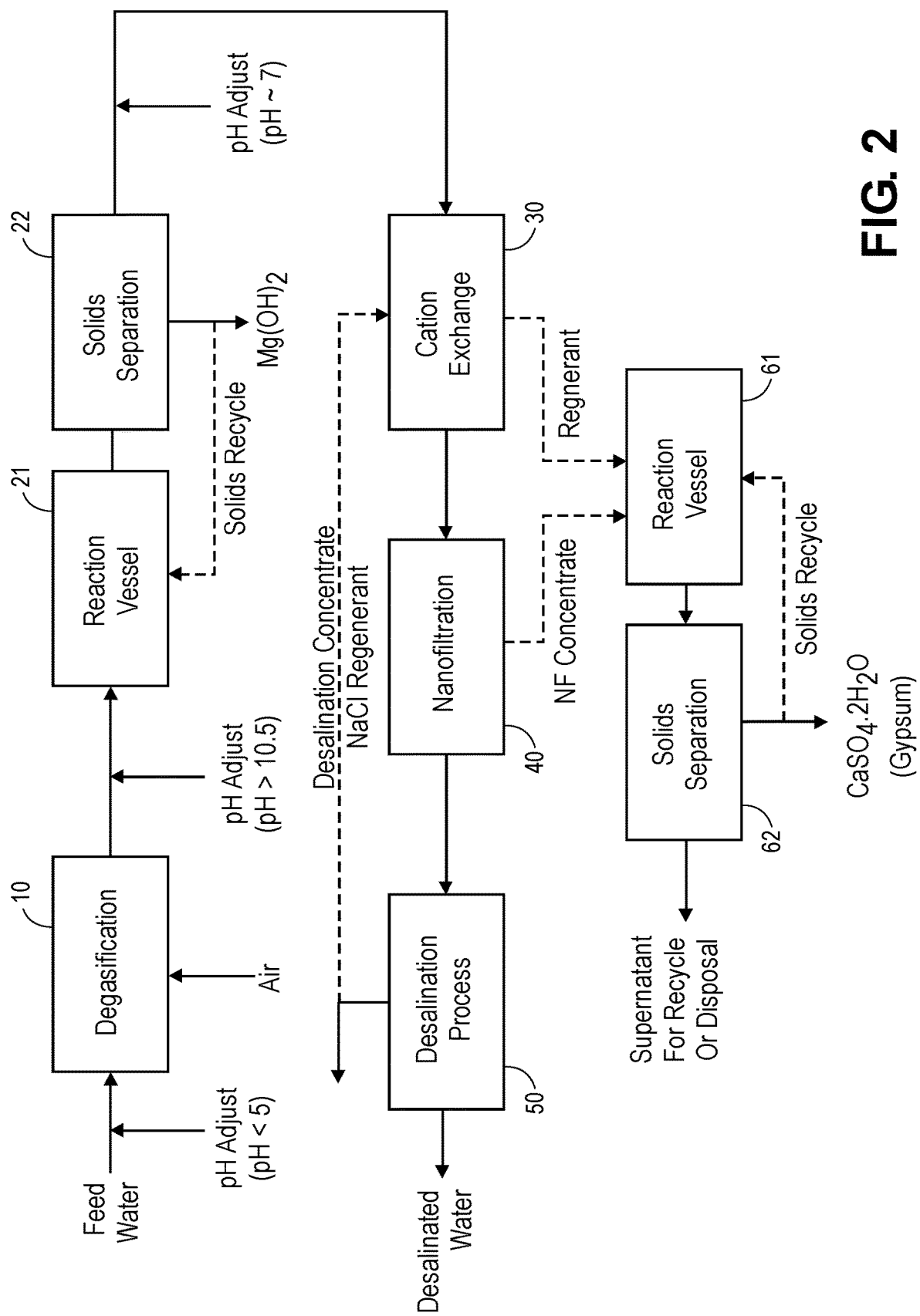
FIG. 2 is a flowchart demonstrating another embodiment of the MRED process disclosed herein.

FIG. 2 provides a slightly more specific embodiment of the process shown in FIG. 1 including pH levels at various stages which were determined to maximize recovery of low quality feed water and also commodifiable materials from FGD wastewater.

In degasification step 10 an acid such as HCl is added to lower the pH to less than 5 to remove alkalinity. The feed solution is then subjected to air stripping to remove dissolved $CO_2$. Degasification prevents subsequent formation of carbonate precipitates, especially $CaCO_3$. This reduces scaling of membrane and thermal desalination surfaces and improves the purity of gypsum ($CaSO_4 \cdot 2H_2O$) produced in the final precipitation step. Removal of dissolved $CO_2$ also increases the purity of $Mg(OH)_2$. Finally, as stated with respect to the embodiment shown in FIG. 1, removal of alkalinity reduces acid and base requirements for subsequent pH adjustments.

$Mg(OH)_2$ Precipitation (21, 22): The pH is raised to greater than 10.5 using a strong base such as sodium hydroxide, potassium hydroxide, or hydrated lime to achieve precipitation of $Mg(OH)_2$. This process also removes dissolved silica ($SiO_2$) as well as residual Al, Fe, Mn and other metals. A separate mixed reaction vessel 21 is provided to achieve enhanced precipitation. The option of solids recycle is included to provide nucleation sites to improve the precipitation process. $Mg(OH)_2$ solids are removed in a tube settler, membrane filter, granular media filter, or other solids separation device.

Cation Exchange (30): Following $Mg(OH)_2$ precipitation, the only polyvalent cation remaining in solution is $Ca^{2+}$. Cation exchange is used to selectively remove this ion by exchanging with Na in an ion exchange process. Experiments and theoretical considerations have shown that this process is effective up to an ionic strength of about 0.2 M (TDS ~12,000 mg/L). The performance of cation exchange under high ionic strength solutions establishes the upper salinity limit for the MRED process. The solution leaving the cation exchange process includes the cation Na and anions dominated by $Cl^-$ and $SO_4^{2-}$. When the cation exchange resin is saturated with $Ca^{2+}$ it is regenerated using a concentrated NaCl brine generated as concentrate from the desalination unit, thus eliminating the requirement to purchase salt.

Nanofiltration (40): The nanofiltration (NF) process uses a softening membrane, sometimes referred to as a loose RO membrane. Softening membranes selectively concentrate polyvalent ions from the feed solution which are then removed in the concentrate. Since $Ca^{2+}$, $Mg^{2+}$, other metals and $CO_3^{2-}$ are removed in the degasification, precipitation and cation exchange processes, the only polyvalent ion present in solution is $SO_4^{2-}$. Therefore, the NF process is not subject to mineral scaling and it can be operated at a high feed water recovery ratio.

Gypsum ($CaSO_4 \cdot 2H_2O$) Precipitation (61, 62): The brine solution from the cation exchange process containing high concentrations of $Ca^{2+}$ is combined with the concentrate from the NF process which has a high $SO_4^{2-}$ concentration. They are combined in a mixed reaction vessel (61) to precipitate gypsum ($CaSO_4 \cdot 2H_2O$). The option of solids recycle is included to provide nucleation sites to improve the performance of the precipitation process. Gypsum solids are removed in a sedimentation basin, tube settler, membrane filter, or other solids separation device. The supernatant from the gypsum precipitation process consists of a NaCl solution that also contains elevated concentrations of $Ca^{2+}$ and $SO_4^{2-}$. This is caused by incomplete gypsum precipitation due to its relatively high solubility. This solution can be recycled back to the cation exchange process to improve recovery of water and Ca or simply disposed of as a brine solution.

Desalination (50): The feed water to the desalination process consists primarily of a NaCl solution with very little or no potential for scale formation. This allows high recovery of the feed water, less scale formation, and easier cleaning of process equipment. Any type of desalination process can be used. It will produce high quality water suitable for any industrial or agricultural use, or potable water supply. Concentrate from the desalination unit will consist of a high strength NaCl brine. Some of the concentrate will be used to regenerate the cation exchange resins. The rest may have value as salt for industrial processes, or it could simply be disposed of as a small volume of concentrated brine.

Of course FGD water is not the only type of water that can be treated using the MRED process described herein. In addition or instead of the $Mg(OH)_2$, and gypsum products described above with respect to the FGD-tuned process, other compounds that could be removed or recovered by the MRED process include iron, manganese, strontium and other metals, silica, and dissolved organic matter (DOM). Removal of each of these constituents will improve the performance of a subsequent desalination process.

Oxidized forms of iron, manganese, and many other transition metals form insoluble oxide or hydroxide phases at high pH. Accordingly, the degasification step described above would establish oxidizing conditions in the solution. Raising the pH to greater than 10.5 prior to precipitation would result in precipitation of iron and manganese as well as copper, lead, mercury, nickel, zinc and other metals. High pH precipitation of magnesium hydroxide will also remove dissolved silica (SiO2) [39,46]. Removal of these constituents will decrease the purity of the magnesium hydroxide, however, except in the most unusual circumstances, the molar concentration of magnesium in hard water is orders of magnitude greater than the concentration of other metals or silica so the impact on the quality of the magnesium hydroxide precipitate will be small.

Strontium and barium, if present, would not be removed by the high pH precipitation in stage 20 because they do not form insoluble hydroxide precipitates. They would, however, be removed by ion exchange process 30 and/or subsequent precipitation stage 60. Their sulfate phases, $SrSO_4$ and $BaSO_4$, are less soluble than gypsum. As with metals removed by high pH precipitation, high concentrations of strontium or barium would affect the purity of the gypsum precipitate, however a water with this chemistry would be unusual.

Dissolved organic matter (DOM) could be removed via anion exchange or other similar means, depending on its concentration in the feed water.

To demonstrate the MRED process, the flows and solution chemistry following each unit operation was modeled for an MRED process designed to treat 1900 m3/d (500,000 gal/d) of low TDS (4290 mg/L) water having the feed water chemistry shown in Table 1. Concentrations are reported in units of milligrams per liter (mg/L) and milliequivalents per liter (meq/L).

TABLE 1

Simulated brackish water composition for low, medium, and high TDS solutions

| Constituent | Low TDS soln. (mg/L) | meq/L | Medium TDS soln. (mg/L) | meq/L | High TDS soln. (mg/L) | meq/L |
|---|---|---|---|---|---|---|
| Na+ | 398 | 17.3 | 2540 | 110.4 | 6680 | 290.4 |
| Ca2+ | 725 | 36.3 | 659 | 33.0 | 4240 | 212.0 |
| Mg2+ | 199 | 16.4 | 534 | 44.0 | 2830 | 232.9 |
| Cl− | 1290 | 36.2 | 3380 | 95.2 | 24,300 | 684.5 |
| SO42− | 1480 | 30.8 | 4340 | 90.4 | 2180 | 45.4 |
| Alkalinity[a] | 151 | 3.0 | 100 | 2.0 | 274 | 5.5 |
| TDS | 4290 | | 11,600 | | 40,500 | |
| Ionic strength (M) | 0.09 | | 0.21 | | 0.96 | |

[a]Alkalinity is in units of mg CaCO3/L.

Figure 3:
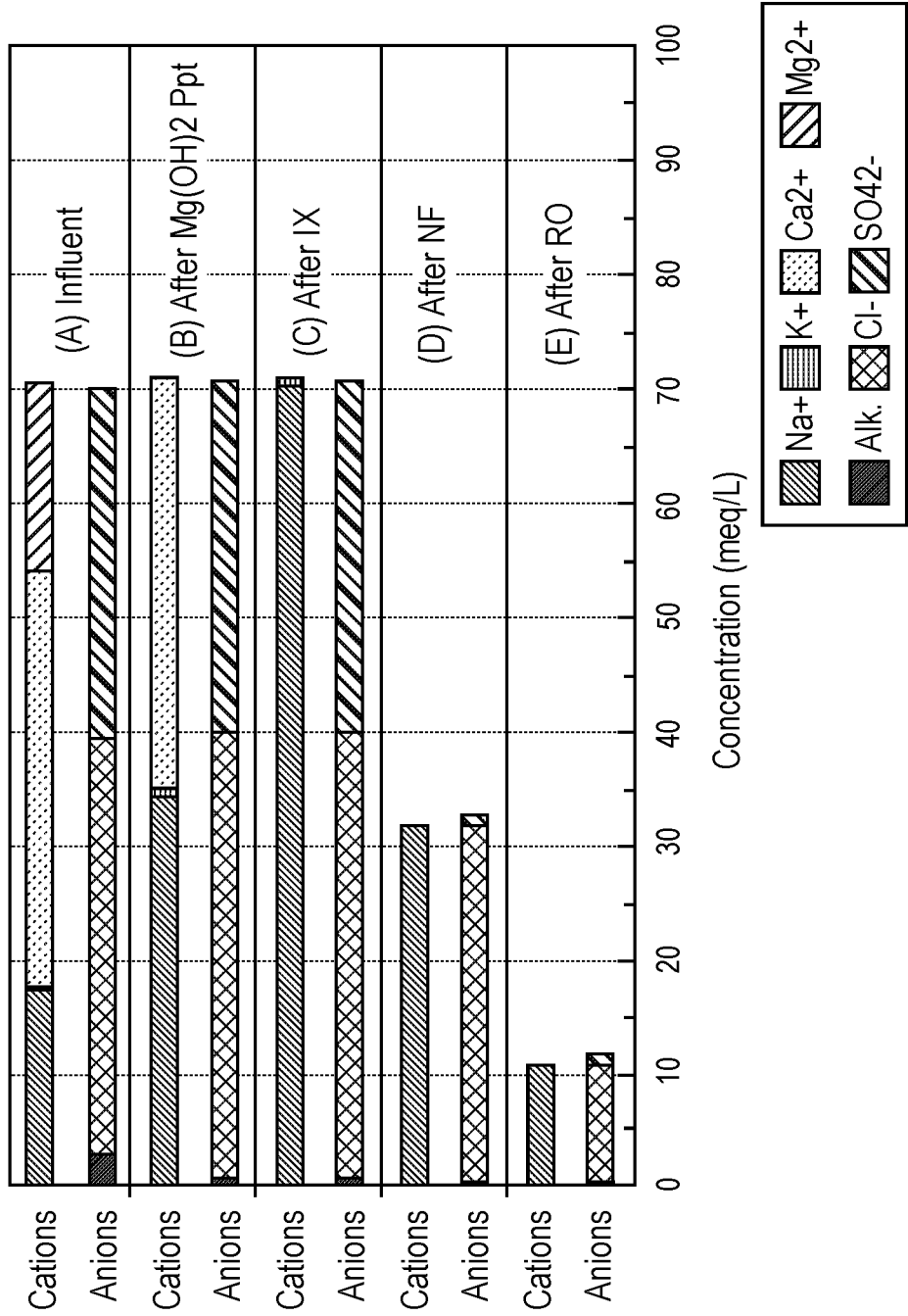
FIG. 3 is a bar graph showing the solution chemistry for a typical low TDS feed water solution after each unit operation

FIG. 3 shows the solution chemistry for the low TDS feed water solution after each unit operation displayed as pairs of horizontal bar graphs in which the top bar represents the concentration of major cations in the solution and the lower bar shows the major anions.

The amount of base needed to raise the degasified solution to pH greater than 10.5 for high pH precipitation is determined by the stoichiometry of the magnesium hydroxide precipitation reaction plus an additional amount that is determined by the alkalinity of the final solution. In this example, magnesium hydroxide precipitation generates 906 kg/d of solids at a flow rate of 43 m3/d assuming a 0.6% solids concentration from the membrane filtration process based on performance of membrane filtration systems treating drinking water.

Figure 4:
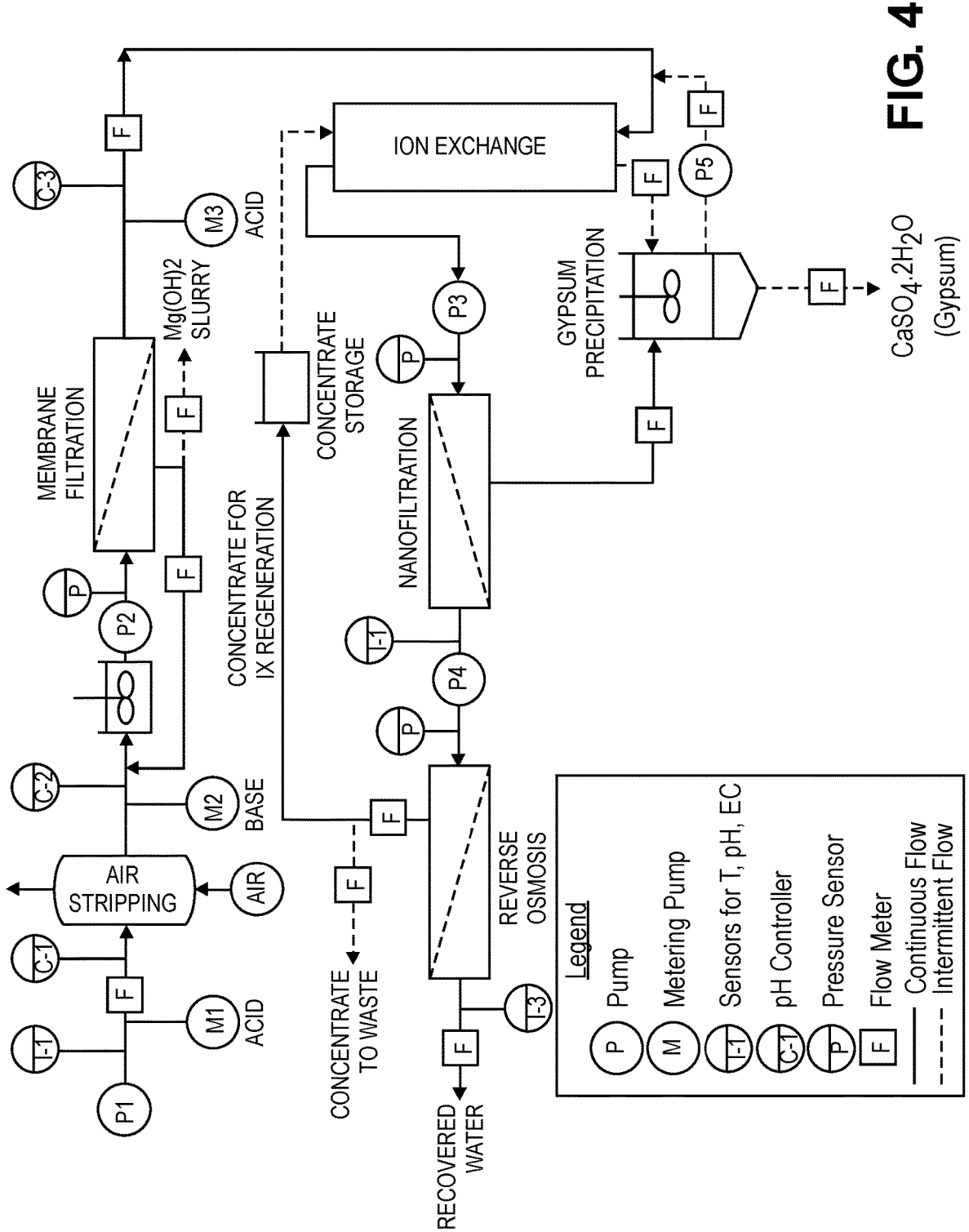
FIG. 4 is a flowchart demonstrating yet another embodiment of the MRED process disclosed herein.

The cations in the water entering the IX process consist of only sodium at 34 meq/L and calcium at 36 meq/L (FIG. 4, at B). The IX operation will be operated to remove all of the calcium from solution. The number of empty bed volumes (BVs) of water that can be treated by the IX process is determined by the calcium concentration in the water entering the cation exchange process and the IX resin capacity. After removing magnesium as magnesium hydroxide and calcium by IX, the water entering the NF process contains no calcium or magnesium so that the only remaining major ions are sodium, chloride and sulfate.

Experimental data and theoretical modeling suggest that the NF process will remove 96% of the sulfate, ~20% of chloride, and ~55% of sodium. Using these values produces the chemistry of the NF permeate shown in FIG. 3, panel D. The water passing through the NF membrane consists almost entirely of sodium and chloride which enables subsequent desalination by a membrane or thermal process with little fouling potential. FIG. 3 panel D shows that the NF process partly desalinates the solution and reduces the total concentration of ions from 140 meq/L to about 60 meq/L.

The IX regenerant chemistry has a high calcium concentration, while the NF concentrate has a high sulfate concentration. The sulfate concentration in the NF concentrate is about 300 meq/L whereas the calcium concentration in the IX regenerant is 900 meq/L, three times higher. However, the flow of NF concentrate is almost exactly three times that of the IX regenerant so a stoichiometric balance of calcium and sulfate is maintained. If the stoichiometry does not balance use of sulfuric acid ($H_2SO_4$) instead of hydrochloric acid (HCl) will increase the sulfate concentration, or use of hydrated lime ($Ca(OH)_2$) instead of sodium hydroxide (NaOH) will increase the calcium concentration to help achieve a stoichiometric balance.

The desalination concentrate is used to regenerate the IX columns; after regeneration it is combined with high sulfate concentrate from the NF process to precipitate gypsum. Gypsum settles well and can be removed by gravity settling. 3900 kg/d of gypsum will precipitate as a 50 m3/d slurry using a 7% settled solids concentration found by Tandukar [41]. Note, however, that gypsum is a relatively soluble mineral. The final calcium and sulfate concentrations after gypsum precipitation when treating the low TDS water are 130 mM and 20.2 mM respectively. This supernatant from gypsum precipitation can be returned to the IX process to recover residual calcium and sulfate as shown in FIG. 2.

Desalination by RO was modeled assuming 98% feed water recovery based on a 60 meq/L (1,750 mg/L) NaCl feed water with negligible fouling potential. For this water chemistry a seawater desalination system would be appropriate. RO ion rejection values predicted by a theoretical model were used in the process model. The final treated and desalinated water is projected to have a final TDS concentration of less than 600 mg/L (FIG. 4 panel E.)

The concentrate from the RO process has an ionic strength of 1.1 M and a TDS of approximately 62,000 mg/L (FIG. 3 panel E). This solution, consisting almost entirely of sodium and chloride ions, is used to regenerate the IX columns.

At each step in the MRED process the flows of water into and out of each unit operation, and the volumetric flows of slurries produced by the operation are summarized in Table 2. The example described in this section was modeled to treat a low TDS FGD wastewater with the chemistry shown in Table 1. For an influent flow of 1900 m3/d (500,000 gal/d) the MRED process recovers 1560 m3/d of high quality desalinated water for a feed water recovery of 82%. Furthermore, by recycling the supernatant from the gypsum precipitation process, an additional 175 m3/d of water may be retained for an overall feed water recovery of 91%. This reduces the concentrate stream by approximately 58%, which greatly reduces the volume of water that must be disposed of. A summary of the overall process performance is presented in Table 2.

TABLE 2

Summary of volumetric and mass flows for treating 1900 m3/d of brackish groundwater.

| Parameter | Units | Value |
|---|---|---|
| Influent flow | m3/d | 1900 |
| Mass of Mg(OH)2 recovered | kg/d | 906 |
| Vol. of Mg(OH)2 recovered | m3/d | 143 |
| Mass of gypsum recovered | kg/d | 3850 |
| Vol. of gypsum recovered | m3/d | 50 |
| Treated water flow | m3/d | 1740 |
| Fractional feed water recovery | % | 91 |

FIG. 4 is a detailed diagram for a pilot plant using the MRED process that shows various pumps, meters, sensors, controllers, and other relevant controls, instruments, meters, and sensors.

The specific methods and compositions described herein are representative of preferred embodiments and are exemplary and not intended as limitations on the scope of the invention. Other objects, aspects, and embodiments will occur to those skilled in the art upon consideration of this specification and are encompassed within the spirit of the invention as defined by the scope of the claims. It will be readily apparent to one skilled in the art that varying substitutions and modifications may be made to the invention disclosed herein without departing from the scope and spirit of the invention.

Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

The following are incorporated by reference for all purposes:

Thomson, B., Tandukar, S., Shahi, A., Lee, C., Howe, K. (2020). Mineral Recovery Enhanced Desalination (MRED) Process: An Innovative Technology for Desalinating Hard Brackish Water, Desalination, 496, 114761, 15 p. https://doi.org/10.1016/j.desal.2020.114761

Howe, K., Thomson, B., Tandukar, S., Shahi, A., Lee, C. O. (2020). Flue Gas Desulfurization Wastewater Treatment, Reuse & Recovery, Final Report to DOE National Energy Technology Laboratory, Grant No. DE-FE0030584, Morgantown, WV, 176 p.

Thomson, B., Howe, K., Lee, O., Tandukar, S., Shahi, A., (2019). The Mineral Recovery & Enhanced Desalination (MRED) Process, presentation to the Am. Membrane Techy. Assoc. (AMTA), Southwest Membrane Operator Assoc. (SWMOA), Albuquerque, NM Clifford, D. A., Sorg, T. J., & Ghurye, G. L. (2011). Ion Exchange and Adsorption of Inorganic Contaminants. Ch. 12. In Water Quality and Treatment: A Handbook on Drinking Water (6th ed., p. 97). McGraw-Hill.

Higgins, T. E., Sandy, A. T., & Givens, S. W. (2009). Flue Gas Desulfurization Wastewater Treatment Primer. Power, 153(3), 8.

Mcmahon, P. B., Bohlke, J. K., Dahm, K. G., Parkhurst, D. L., Anning, D. W., & Stanton, J. S. (2016). Chemical Considerations for an Updated National Assessment of Brackish Groundwater Resources. Ground Water, 54(4), 464-475. https://doi.org/10.1111/gwat.12367

Mcmahon, P. B., Bohlke, J. K., Dahm, K. G., Parkhurst, D. L., Anning, D. W., & Stanton, J. S. (2016). Chemical Considerations for an Updated National Assessment of Brackish Groundwater Resources. Ground Water, 54(4), 464-475. https://doi.org/10.1111/gwat.12367

Randtke, S. J. (2011). Precipitation, Coprecipitation, and Precipitative Softening. In Water Quality & Treatment: A Handbook on Drinking Water, 6th Ed., J. K. Edzwald (ed.) (p. 97). McGraw-Hill.

What is claimed is:

1. A process for treating brackish or saline water comprising, performing, in sequence, the unit operations of low pH degasification; high pH precipitation; ion exchange, nanofiltration, and desalination to produce high quality desalinated water; wherein commodity materials are selectively obtained from at least one of the high pH precipitation, ion exchange, and nanofiltration unit operations;

wherein the commodity material comprises sodium chloride salt brine and using the sodium chloride salt brine to regenerate an ion exchange column in the ion exchange unit operation; and low pH de gasification occurs at a pH of less than 5;

high pH precipitation occurs at a pH greater than 10.5; and high quality desalinated water is water with total dissolved solids (TDS) concentration of less than 500 mg/L.

2. The process of claim 1 wherein the brackish or saline water has a total dissolved solids (TDS) concentration of between 1,000 mg/L to 20,000.

3. The process of claim 1 wherein the brackish or saline water is flue gas desulfurization (FGD) wastewater.

4. The process of claim 1 wherein the commodity materials comprise magnesium hydroxide obtained from a selective precipitation unit operation at high pH.

5. The process of claim 1 wherein byproducts from the ion exchange and nanofiltration unit operations are combined and precipitated to obtain a commodifiable product.

6. The process of claim 1 wherein the brackish or saline water comprises concentrations of suspended solids, one or more multivalent ions or dissolved silica that cause scale formation on surf aces of thermal or membrane desalination equipment.

7. The process of claim 6 wherein the multivalent ions are selected from the group consisting of calcium, magnesium, iron, aluminum, bicarbonate/carbonate, sulfate, and dissolved silica.

8. The process of claim 5 wherein the commodifiable product is gypsum.

9. The process of claim 1 wherein the step of low pH degasification comprises lowering the pH of the water to less than pH 6.

10. The process of claim 1 wherein the step of low pH degasification comprises removing dissolved carbon dioxide from the low pH solution by air stripping.

11. The process of claim 1 wherein the pH of the feed water solution after degasification is raised to greater than pH 10.5 by addition of a strong base to achieve selective removal of high purity commodifiable magnesium hydroxide.

12. The process of claim 11 wherein selective removal of high purity commodifiable magnesium hydroxide comprises removing suspended solids from solution.

13. The process of claim 12 wherein the pH of the water is adjusted to approximately pH 7.0 after high pH selective magnesium hydroxide precipitation during or prior to the ion exchange unit operation.

14. The process of claim 1 wherein the desalination step produces a concentrate stream containing sodium chloride salt as a concentrate that is at greater than 1% concentration.

15. The process of claim 1 wherein magnesium is selectively obtained via high pH precipitation of magnesium hydroxide, calcium is selectively removed by cation exchange and sulfate is selectively removed by nanofiltration.

* * * * *